June 12, 1956  S. W. SAM  2,749,789
REMOVABLE, PERIPHERALLY MOUNTED RETAINER MEANS
RESILIENTLY RETAINED ON THREADLESS BOLT
Filed Nov. 25, 1955
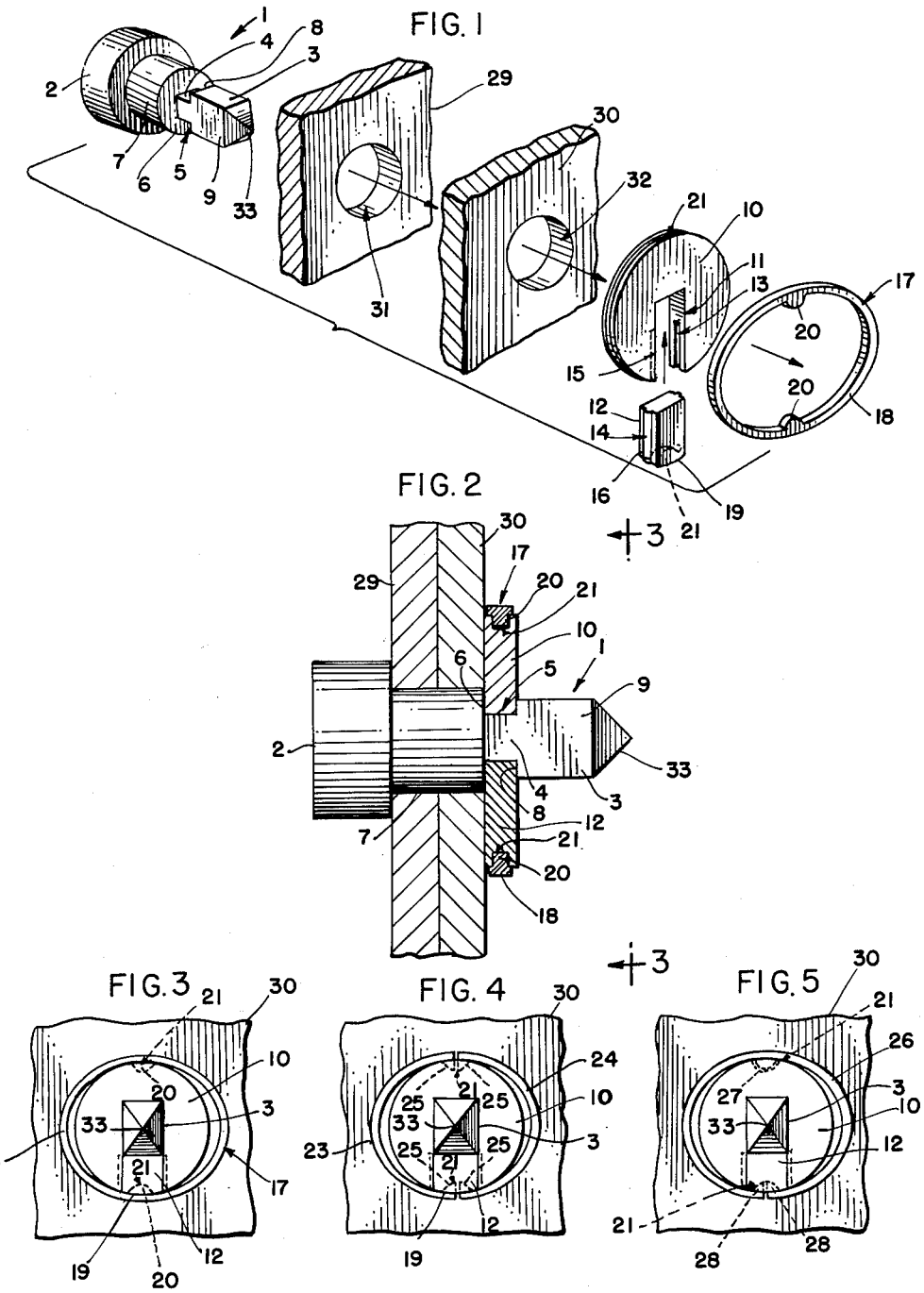

United States Patent Office 2,749,789
Patented June 12, 1956

2,749,789

REMOVABLE, PERIPHERALLY MOUNTED RETAINER MEANS RESILIENTLY RETAINED ON THREADLESS BOLT

Sam W. Sam, Chicago, Ill.

Application November 25, 1955, Serial No. 549,004

The entire term of the patent has been dedicated to the public

4 Claims. (Cl. 85—8.8)

This invention relates in general to a mechanical fastener or fastening device and, more particularly, to a fastener for securing or fastening elements together. More specifically, the invention relates to a fastening device in the nature of a bolt which is provided with a securing element to replace the conventional nut and bolt arrangement.

The fastening means of the invention comprises, in general, an unthreaded bolt member, embodying a head and an integral stem, which is adapted to secure one element to another such as by securing two members together, or to apply a drawer handle to a drawer. The bolt member has a part of the stem provided with a reduced portion intermediate its ends to receive a washer-like element or disk having a radial cutout or slot provided therein. The slot in the disk element receives the reduced portion of the bolt stem. An interengaging radial segment fits into the slot in the disk and engages the reduced part of the stem, whereby the radial segment cooperates with the disk element and with the reduced stem part of the bolt member. An elliptical spring locking ring means is adapted to extend about the periphery of the disk member and the radial segment to lock the segment in position with respect to the disk and the stem of the bolt member. Means are also provided to prevent the radial segment from rotating, or from moving out of the segment slot in the disk member. The means for securing the radial segment to the disk member and to the bolt stem preferably comprises integral fingers, nibs, or protuberances formed on the spring locking member, the fingers being adapted to engage cooperating notches in the radial segment and in a part of the disk member at their peripheries.

Applicant hereby dedicates this invention to the United States of America and the inhabitants thereof.

The primary object of the present invention consists in the provision of a new and novel mechanical fastening member to permit easy and quick assembly of the parts, and quick and easy application to, and detachment from, a member with which the fastener is to be used, the use of special tools not being required.

Another object of the invention consists in the provision of a disk element having a radial slot formed therein, into which slot a cooperating radial segment fits, the parts being held in assembled locked position by a flexible locking ring or member which is snapped over the periphery of the disk element and the segment, to hold the parts in relative adjusted position, there being fingers formed on the locking member to engage complementary depressions or recesses in the disk and segment.

A further object of the invention consists in the provision of a mechanical fastener which is adapted to dispense with the usual threaded bolt and nut arrangement, there being improved means including a spring locking element having a part engaging a recess in the peripheral surface of the disk and a part engaging a recess in the outer peripheral surface of the segment, to hold the radial segment in position and the disk maintained in position with respect to the bolt stem.

A still further object of the invention resides in the provision of a clip made of springy resilient material and engaging the disk and segment to hold the parts of the device in operable assembled relation whereby the washer, the segment and the clip may be snapped in place, as a unit, over the end of the bolt stem into position on the reduced portion of the stem.

Other objects and advantages will be apparent throughout the progress of the specification which is to follow.

The accompanying drawing illustrates certain selected embodiments of the invention, and the views therein are as follows:

Fig. 1 is a detail exploded view of a device embodying the invention and showing the manner in which the device is used, the various parts being shown in perspective;

Fig. 2 is a detail vertical sectional view showing the device of the invention in assembled locked position, and securing two elements together;

Fig. 3 is a detail end elevational view looking in the direction of the arrows 3—3 of Fig. 2;

Fig. 4 is a view similar to Fig. 3, but showing a modified form of locking means for the device; and Fig. 5 is a view similar to Figs. 3 and 4 and showing another modified arrangement of locking means.

The particular construction herein disclosed for the purpose of illustrating the invention comprises a bolt member 1, Figs. 1 and 2, having a head 2 and an integral stem 3. The stem 3 is cut away and reduced in size to provide a slot or groove 5. The slot or groove 5 provides an abutment or engaging surface 6 on the part 7 of the stem at the head end thereof, and a spaced abutment 8 at lower or free end 9 of the stem.

A disk-like element or washer 10 is provided with a radial segmental cutout to form a radial slot 11 which receives the reduced part 4 of the stem 3, the washer 10 fitting between the abutments 6 and 8. A radial segment 12 is adapted to be received in the slot 11 and is adapted to be radially slidable into the radial slot 11 for engagement with the reduced stem part 4, the radial segment 12 being arranged between the abutment sides 6 and 8 when the washer 10 is placed in position on the bolt.

The radial segment is less in length than the length of the slot so as to provide an opening to receive the bolt when the washer and its segment are arranged in operative relation on the reduced part of the stem. The side walls of the washer defining the sides of the radial slot 11 are parallel and extend forwardly inwardly from the periphery of the washer to the opening.

The radial segment 12 is retained in the slot 12 by cooperating interengaging means 13 and 14 on the disk 10 and the radial segment 12, respectively, to prevent lateral displacement of the radial segment 12 with respect to the washer 10. The interengaging means 13 and 14, Fig. 1, may comprise outwardly inwardly extending grooves 15 on the inner edges of the washer 10 at the sides of the radial slot 11, cooperating with projecting ribs 16 on each side edge of the radial segment 12, Fig. 1. However, the interengaging means 13 and 14 may be reversed, whereby the ribs may be formed on the outer side edges of the radial slot in the washer 10, and the grooves may be formed along the side edges of the radial segment.

The radial segment 12 is adapted to be arranged in adjusted or locked position with respect to the disk member 10 by locking means in the form of an arcuate spring clip 17 which is elongated and contacts only at both points along its short axis, resiliently pressing inwardly radially the segment and a point of the rim of the washer diametrically opposite the segment, the elongate arcuate spring clip yielding and resiliently holding the washer and the segment together during normal operation.

The elongate arcuate spring clip 17 may comprise a continuous ring 18 made of springy resilient material, such as spring metal. The ring 18 is longer in one direction than the other, preferably being elliptical in shape, so that it may be applied easily about the outer periphery of the washer 10 and its cooperating radial segment 12. After the ring 18 is applied over the washer and segment, there is formed a unit which will snap over the bolt because of the springy or resilient characteristics of the material from which the ring 18 is made.

The elongate or elliptical ring 18 may be made of continuous preformed wire of springy material and round in cross section, or instead it may be a flat band, as shown particularly in Figs. 1 and 2. The ring 18, which is arranged about the periphery of the washer and the outer peripheral end of the radial segment 12, holds these two members in yieldingly locked assembled position.

The springiness of the material from which the elongate yieldable resilient spring clip 17 is made, will cause the segment 12 to be yieldingly and resiliently maintained in position on the reduced part 4 of the bolt stem 3. The arrangement of the parts is such that the outer end 19 of the segment 12, Fig. 1, will be coextensive with the peripheral circular outline of the washer so that when the parts are assembled, a true circle is formed.

The arcuate elongated spring clip 17 is provided with interlocking means inwardly extending, oppositely disposed, to retain axially the segment in the slot in the washer. The interlocking means are between the spring clip and the combined rim of the washer and the radial segment and retain the spring clip on the rim of the washer and the segment and prevent the spring clip from rotating on the combined rim of the segment and washer. This interlocking preferably comprises fingers, nibs or protuberances 20, 20, Fig. 1, which are adapted to engage cooperating recesses or notches 21, 21 formed in the periphery of the washer 10 and in the end of the radial segment 12. The fingers 20 engage the recesses 21, prevent rotary movement of the spring clip 17 with respect to the washer 10 and its cooperating radial segment 12. The abutments 6 and 8 prevent side movement of the washer 10 along the bolt stem 3.

The spring clip 17 may be made in any convenient manner, but it is believed advantageous that it be formed in the nature of a band, Figs. 1 to 3, cut to length from a continuous tubular member, such as an extruded elliptical tube, the band being cut from the tube to the desired length.

The embodiment shown in Fig. 4 discloses the spring clip 17 as comprising two sections 23 and 24, each of which are relatively semi-circular. The sections 23 and 24 are each made of resilient, springy material, and each has inwardly extending diametrically opposed fingers 25 formed at their outer free ends which engage the cooperating recesses or notches 21 in the periphery of the washer 10 and the end 19 of radial segment 12, respectively. Each notch 21 in Fig. 4 is of a size sufficient to accommodate two fingers 25.

The elongate arcuate spring clip 17 may comprise a single split ring 26, Fig. 5, instead of the continuous locking ring 18, as shown in Figs. 1, 2 and 3, or the two-part locking ring 23, 24 disclosed in Fig. 4. The single split locking ring 26 may include an inwardly extending integral finger 27 which engages the cooperating notch or recess 21 in the washer 10. The split locking ring 26 may have integral fingers 28, 28 at its free ends, which are diametrically opposite the finger 27 and engage the socket or recess 21 formed in the peripheral edge 19 of the radial segment 12. It is to be understood, of course, that the locking ring 26 may have the fingers 27 and 28 reversed so that the engaging fingers 28 will engage the recess 21 in the washer, while the single finger 27 may engage the notch or recess 21 in the end 19 of the segment 12, the notches in any case being of a size to accommodate the desired arrangement. The mechanical fastener of the invention, while herein shown as being oblong in cross section, may be adaptable for use on a circular stem or shaft, or any other configuration.

The mechanical fastener of the invention comprises few and simple parts, which can be readily and economically manufactured, and the washer, segment and spring clip to be applied as a unit, easily and quickly over the bolt to hold certain parts together, or to connect certain elements together.

In Figs. 1 and 2, there are shown two elements 29 and 30 which are adapted to be held together by means of the fastener of the invention. These elements are provided with centrally positioned openings 31 and 32, respectively, through which the stem of the bolt passes. It makes no difference for which purpose the mechanical fastener is to be used, as it can be conveniently used for connecting, for instance, handles to drawers, whereby the bolt head 2 is adapted to engage a handle (not shown), which may be located on the outside of a drawer (not shown), with the washer 10, its cooperating segment 12, and its spring clip 17 applied in position on the inside of the drawer.

The device is capable of performing the same function as a conventional threaded bolt and its cooperating nut. The present fastener is of particular advantage where two or more elements are to be held together, Figs. 1 and 2, particularly in cases where it is not necessary to draw the parts up tightly together into clamping engagement.

The bolt member 1, whether its stem be oblong in cross section, or whether it be of any other configuration, may have its outer free end pointed as indicated at 33.

Changes may be made in the form, construction and arrangement of the parts without departing from the spirit of the invention or sacrificing any of its advantages, and the right is hereby reserved to make all such changes as fall fairly within the scope of the following claims.

I claim:

1. A mechanical fastener comprising an apertured washer having a radial slot with parallel side walls extending from the periphery of the washer to the opening therein, a radial segment of less length than said slot positioned in said slot, said radial segment being radially slidable inwardly and outwardly in said radial slot, means to retain axially of the fastener said radial segment in said slot and to limit movement of said radial segment in said slot, a retaining spring clip comprising arcuate portions and a pair of substantially diametrically opposed key portions extending radially inwardly from said arcuate portions, said spring clip resiliently engaging and pressing radially inwardly only said radial segment and a point on the rim of said washer substantially diametrically opposite from said radial segment, said radial segment having a recess in the peripheral end thereof, one of said opposed key portions of the spring clip being engaged in the recess in the radial segment, the arcuate sections of said spring clip being resilient whereby the spring clip may be flexed at right angles to the substantially diametrically opposed key portions to increase the minimum internal diameter of said spring clip to a larger dimension than the diameter of said washer whereby said spring clip may be moved axially away from engagement with said mechanical fastener.

2. A mechanical fastener comprising an apertured washer having a radial slot with parallel side walls extending from the periphery of the washer to the opening therein, a radial segment of less length than said slot positioned in said slot, said radial segment being radially slidable inwardly and outwardly in said radial slot, means to retain axially of the fastener said radial segment in said slot and to limit movement of said radial segment in said slot, a two-piece retaining spring clip comprising two arcuate portions and a pair of substantially diametrically opposed key portions extending radially inwardly from the ends of each of said arcuate portions, each part of said spring clip resiliently engaging and pressing radially inwardly only said radial segment and a point on the rim of said washer substantially diametrically opposite from said radial segment, said radial segment having a recess in the peripheral end thereof, one of said opposed key portions of each part of the spring clip being engaged in the recess in the radial segment, the arcuate sections of each part of said spring clip being resilient whereby each part of the spring clip may be flexed at right angles to the substantially diametrically opposed key portions of each of said parts to increase the minimum internal diameter of each part of said spring clip to a larger dimension than the diameter of said washer whereby each part of said spring clip may be moved axially away from engagement with said mechanical fastener.

3. A mechanical fastener comprising an apertured washer having a radial slot with parallel side walls extending from the periphery of the washer to the opening therein, a radial segment of less length than said slot positioned in said slot, said radial segment being radially slidable inwardly and outwardly in said radial slot, means to retain axially of the fastener said radial segment in said slot and to limit movement of said radial segment in said slot, a one-piece split retaining spring clip comprising arcuate portions and a pair of key portions at the ends of the clip, another key portion intermediate the said ends of said clip, the key portions at the ends of the clip and the intermediate key portion being substantially diametrically opposed, said key portions extending radially inwardly from said arcuate portions, said spring clip resiliently engaging and pressing radially inwardly only said radial segment and a point on the rim of said washer substantially diametrically opposite from said radial segment, said radial segment having a recess in the peripheral end thereof, the pair of key portions at the ends of the spring clip being engaged in the recess in the radial segment, the other key portion being engaged in the opposed recess in the rim, the arcuate sections of said spring clip being resilient whereby the spring clip may be flexed at right angles to the substantially diametrically opposed key portions to increase the minimum internal diameter of said spring clip to a larger dimension than the diameter of said washer whereby said spring clip may be moved axially away from engagement with said mechanical fastener.

4. A device as set forth in claim 1 characterized in that the retaining spring clip is continuous and is non-circular in cross section.

References Cited in the file of this patent

UNITED STATES PATENTS

| | | |
|---|---|---|
| 435,068 | Leidig | Aug. 26, 1890 |
| 684,664 | Anderson | Oct. 15, 1901 |
| 800,561 | Feild | Sept. 26, 1905 |
| 892,478 | Wesson | July 7, 1908 |
| 2,548,874 | Darwin | Apr. 17, 1951 |

FOREIGN PATENTS

| | | |
|---|---|---|
| 907,198 | France | June 18, 1945 |